United States Patent
Atchison et al.

(10) Patent No.: US 10,928,088 B2
(45) Date of Patent: Feb. 23, 2021

(54) HVAC SWITCHABLE COMMUNICATION BUS AND POWER BUS CONTROL BOARD SYSTEMS AND METHODS

(71) Applicant: Johnson Controls Technology Company, Auburn Hills, MI (US)

(72) Inventors: Shaun B. Atchison, Wichita, KS (US); Brian D. Rigg, Douglass, KS (US)

(73) Assignee: Johnson Controls Technology Company, Auburn Hills, MI (US)

( * ) Notice: Subject to any disclaimer, the term of this patent is extended or adjusted under 35 U.S.C. 154(b) by 374 days.

(21) Appl. No.: 15/892,835

(22) Filed: Feb. 9, 2018

(65) Prior Publication Data
US 2019/0145649 A1 May 16, 2019

Related U.S. Application Data

(60) Provisional application No. 62/584,544, filed on Nov. 10, 2017.

(51) Int. Cl.
*F24F 11/63* (2018.01)
*G05B 15/02* (2006.01)

(52) U.S. Cl.
CPC .............. *F24F 11/63* (2018.01); *G05B 15/02* (2013.01)

(58) Field of Classification Search
CPC .................................. F24F 11/63; G05B 13/02
See application file for complete search history.

(56) References Cited

U.S. PATENT DOCUMENTS

| | | | |
|---|---|---|---|
| 5,664,123 A | 9/1997 | Lee et al. | |
| 6,694,381 B1* | 2/2004 | Lo | G06F 9/54 710/11 |
| 6,952,740 B1* | 10/2005 | Cain | H04L 45/02 370/418 |
| 7,349,761 B1* | 3/2008 | Cruse | G05B 19/042 700/276 |
| 7,752,856 B2 | 7/2010 | Senba et al. | |
| 8,055,387 B2 | 11/2011 | McCoy et al. | |
| 8,803,387 B2 | 8/2014 | Kreidler et al. | |
| 9,253,260 B1 | 2/2016 | Bailey et al. | |
| 9,734,973 B2 | 8/2017 | Raciti et al. | |
| 9,762,445 B2 | 9/2017 | Coleman et al. | |
| 2008/0244104 A1 | 10/2008 | Clemente | |

(Continued)

FOREIGN PATENT DOCUMENTS

EP 1267131 B1 10/2006
WO 2003067392 A2 8/2003

*Primary Examiner* — Henry Tsai
*Assistant Examiner* — John B Roche
(74) *Attorney, Agent, or Firm* — Fletcher Yoder, P.C.

(57) ABSTRACT

The present disclosure includes a control board including a switchable input/output port. The switchable I/O port may provide a switchable communication bus capable of selectively supporting one of multiple different communication protocols and may provide a switchable power bus capable of selectively conducting electrical power from one of multiple different power supplies. As such, the control board may communicatively and/or electrically couple to a wide range of devices. To that end, the control board may support the dynamic interchange and reconfiguration of devices coupled to the control board, allowing a control system including the control board greater operational flexibility.

20 Claims, 8 Drawing Sheets

(56) References Cited

U.S. PATENT DOCUMENTS

| | | | |
|---|---|---|---|
| 2013/0124899 A1* | 5/2013 | Liu | G06F 1/3287 |
| | | | 713/324 |
| 2013/0300217 A1* | 11/2013 | Raciti | H01H 71/04 |
| | | | 307/139 |
| 2015/0120062 A1 | 4/2015 | McKinzie et al. | |
| 2016/0025369 A1 | 1/2016 | Lim et al. | |
| 2016/0211985 A1 | 7/2016 | Castillo et al. | |

* cited by examiner

HVAC SWITCHABLE COMMUNICATION BUS AND POWER BUS CONTROL BOARD SYSTEMS AND METHODS

CROSS-REFERENCE TO RELATED APPLICATIONS

This application is a Non-Provisional Patent Application of U.S. Provisional Patent Application No. 62/584,544, entitled "Switchable Communication Bus and Power Bus Control Board Systems and Methods for HVAC Systems", filed Nov. 10, 2017, which is herein incorporated in its entirety for all purposes.

BACKGROUND

The present disclosure generally relates to heating, ventilation, and air conditioning (HVAC) systems and, more particularly, to control systems that may be implemented in a HVAC system.

This section is intended to introduce the reader to various aspects of art that may be related to various aspects of the present techniques, which are described and/or claimed below. This discussion is believed to be helpful in providing the reader with background information to facilitate a better understanding of the various aspects of the present disclosure. Accordingly, it should be understood that these statements are to be read in this light, and not as admissions of prior art.

An HVAC system generally includes a control system to control and/or to coordinate operation of devices, such as equipment, machines, and sensors. For example, the control system may communicate sensor data and control commands with devices in the HVAC system. To facilitate communication, the control system may send and/or receive data according to a specific communication protocol, which may govern parameters such as a data transmission rate and/or checksum data. However, in some instances, different devices use different communication protocols, which govern different data transmission rates and checksum data implementations. That is, for example, a first device provided by a first manufacturer may utilize one communication protocol, while a second device provided by a second manufacturer may utilize a different communication protocol. Thus, to facilitate operational flexibility, a control system may be implemented to be compatible with multiple different communication protocols.

SUMMARY

A summary of certain embodiments disclosed herein is set forth below. It should be understood that these aspects are presented merely to provide the reader with a brief summary of these certain embodiments and that these aspects are not intended to limit the scope of this disclosure. Indeed, this disclosure may encompass a variety of aspects that may not be set forth below.

In one embodiment, an HVAC system includes a first control board. The first control board includes a microcontroller programmed to control operation of equipment in the HVAC system. The control board also includes a first input/output (I/O) port that is communicatively coupled to the microcontroller via a first communication bus, wherein the microcontroller is programmed to communicate on the first communication bus using a first communication protocol. Further, the control board includes a second I/O port that is communicatively coupled to the microcontroller via a second communication bus, wherein the microcontroller is programmed to communicate on the second communication bus using a second communication protocol that is different from the first communication protocol. Additionally, the control board includes a switching device that is electrically coupled to the first I/O port via a first power bus and is electrically coupled to the second I/O port via a second power bus. The control board further includes a switchable I/O port that is communicatively coupled to the microcontroller via a switchable communication bus and is electrically coupled to the switching device via a switchable power bus. Further, when the equipment is coupled to the switchable I/O port, the microcontroller is programmed to determine a target communication protocol used by the equipment, and when the target communication protocol is the first communication protocol, the microcontroller is programmed to communicatively couple the switchable communication bus and the first communication bus and to instruct the switching device to electrically couple the switchable power bus and the first power bus.

In another embodiment, a method to control operation of equipment coupled to a switchable I/O port of a control board in an HVAC system includes determining, using at least one processor on the control board, a target communication protocol used by the equipment. When the target communication protocol is a first communication protocol, which governs communication on a first communication bus, the at least one processor is configured to communicatively couple a switchable communication bus that is coupled to the switchable I/O port to the first communication bus, and the at least one processor instructs a switching device to electrically couple a switchable power bus, which is electrically coupled to the switchable input output port, and a first power bus. When the target communication protocol is not the first communication protocol, the at least one processor communicatively couples the switchable communication bus and a second communication bus, and the at least one processor instructs the switching device to electrically couple the switchable power bus to a second power bus. A second communication protocol different from the first communication protocol governs communication on the second communication bus.

In another embodiment, a tangible, non-transitory, machine-readable medium, comprising machine-readable instructions executable by at least one processor of a control system in an HVAC system that, when executed by the at least one processor, cause the at least one processor to determine a target communication protocol used equipment in the HVAC system that is coupled to a switchable I/O port on a control board in the control system. The instructions, when executed, also cause the at least one processor to instruct a switching device to electrically couple a switchable power bus on the control board to a first power bus on the control board when the target communication protocol is a first communication protocol, and the instructions, when executed, cause the at least one processor to instruct the switching device to electrically couple the switchable power bus to a second power bus on the control board when the target communication protocol is a second communication protocol that is different from the first communication protocol.

BRIEF DESCRIPTION OF THE DRAWINGS

Various aspects of the present disclosure may be better understood upon reading the following detailed description and upon reference to the drawings, in which.

DETAILED DESCRIPTION

Figure 1:
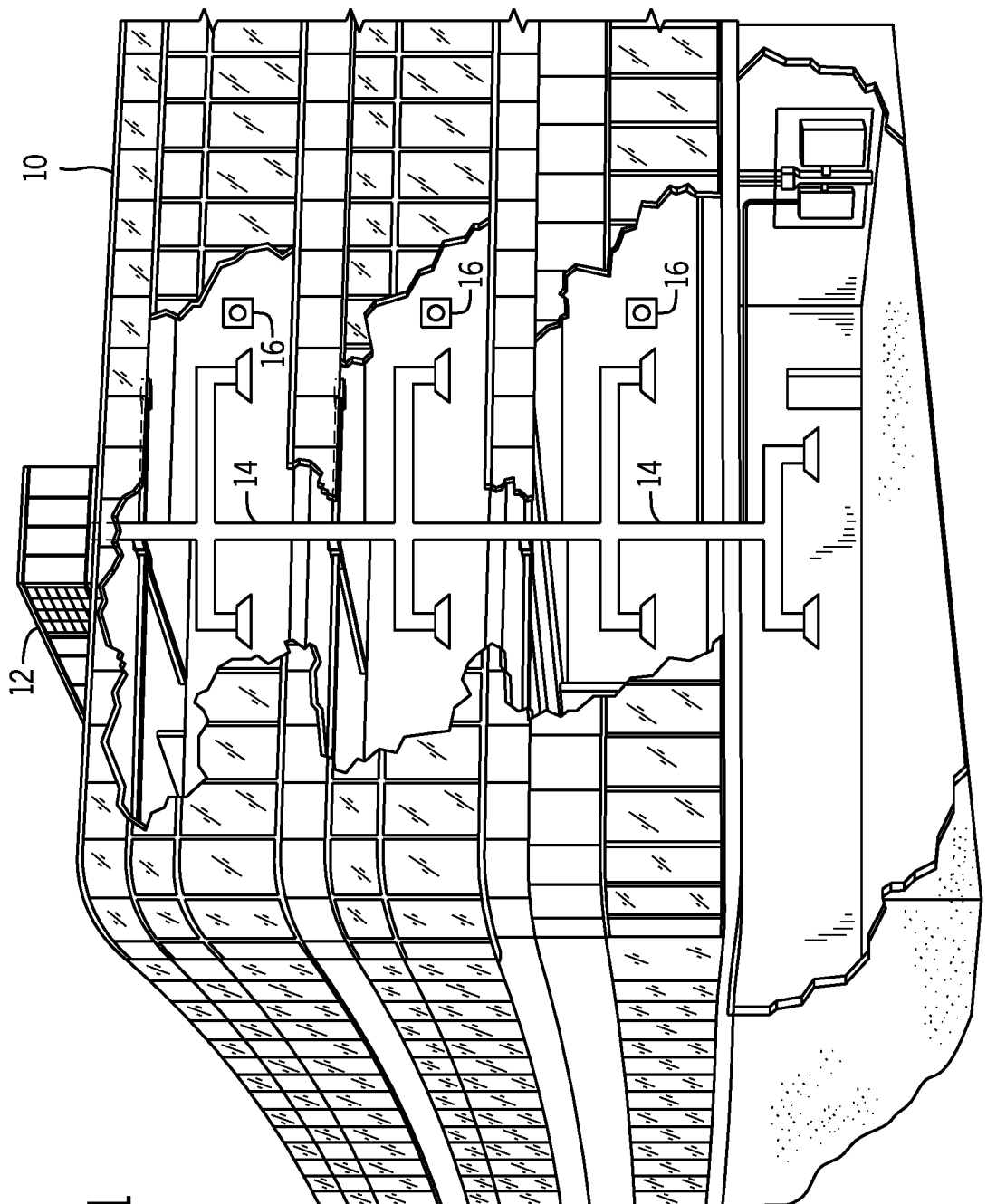
FIG. 1 illustrates a heating, ventilating, and air conditioning (HVAC) system for building environmental management that may employ one or more HVAC units, in accordance with an embodiment of the present disclosure.

One or more specific embodiments of the present disclosure will be described below. These described embodiments are only examples of the presently disclosed techniques. Additionally, in an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but may nevertheless be a routine undertaking of design, fabrication, and manufacture for those of ordinary skill having the benefit of this disclosure.

When introducing elements of various embodiments of the present disclosure, the articles "a," "an," and "the" are intended to mean that there are one or more of the elements. The terms "comprising," "including," and "having" are intended to be inclusive and mean that there may be additional elements other than the listed elements. Additionally, it should be understood that references to "one embodiment" or "an embodiment" of the present disclosure are not intended to be interpreted as excluding the existence of additional embodiments that also incorporate the recited features.

As will be discussed in further detail below, heating, ventilation, and air conditioning (HVAC) systems often utilize a control system to control the operation of devices or equipment within the HVAC system, for example, implemented via one or more control boards or panels. That is, a control board may receive input data or signals from one or more devices in the HVAC system, such as an interface device, a thermostat, a sensor, another control board, or any combination thereof. Additionally or alternatively, a control board may output control commands or signals that instruct one or more other devices in the HVAC system to perform control actions. For example, a control board may receive a temperature setpoint via a thermostat, compare the temperature setpoint to a temperature measurement received from a sensor, and instruct equipment in the HVAC system to adjust operation when the temperature measurement deviates from the temperature setpoint by more than a threshold amount.

To interface with a device in the HVAC system, the control board may communicatively and/or electrically couple to the device via an input/output (I/O) port. The device may be implemented to communicate via a specific communication protocol, which may govern a data transmission rate and/or checksum data included in transmitted data. Thus, to facilitate communication between control board and the device, the control board may be implemented to communicate with the specific communication protocol at the I/O port. Additionally or alternatively, the device may operate using electrical power with target parameters, such as current, voltage, and/or frequency. Accordingly, to electrically couple the control board and the device, the control board may conduct electrical power with the target parameters at the I/O port. Further, in some instances, different devices included in an HVAC system may support different communication protocols and/or operate using electrical power provided by different electrical power supplies.

Accordingly, the present disclosure provides techniques to facilitate improving operational flexibility of a control system, for example, by enabling a control board to be compatible with a wide range of devices and/or different system configurations or layouts. In some embodiments, the control board may include one or more switchable I/O ports each coupled to a corresponding switchable communication bus and/or a corresponding switchable power bus. More specifically, a switchable communication bus may be implemented to selectively support one of multiple different communication protocols, for example, by mapping between memory addresses corresponding with the switchable communication bus and memory addresses corresponding with a different communication protocol via a microprocessor on the control board. Additionally or alternatively, a switchable power bus may be implemented to selectively conduct electrical power from one of multiple different electrical power sources, for example, by electrically connecting the switchable power bus to a different power bus via a switching device or relay on the control board. In this manner, the control board may support the dynamic interchange and reconfiguration of devices coupled to the control board, allowing a control system in the HVAC system greater operational flexibility.

Turning now to the drawings, FIG. 1 illustrates a heating, ventilating, and air conditioning (HVAC) system for building environmental management that may employ one or more HVAC units. In the illustrated embodiment, a building 10 is air conditioned by a system that includes an HVAC unit 12. The building 10 may be a commercial structure or a residential structure. As shown, the HVAC unit 12 is disposed on the roof of the building 10; however, the HVAC unit 12 may be located in other equipment rooms or areas adjacent the building 10. The HVAC unit 12 may be a single package unit containing other equipment, such as a blower, integrated air handler, and/or auxiliary heating unit. In other embodiments, the HVAC unit 12 may be part of a split HVAC system, such as the system shown in FIG. 3, which includes an outdoor HVAC unit 58 and an indoor HVAC unit 56.

In any case, the HVAC unit 12 may be air cooled device that implements a refrigeration cycle to provide conditioned air to the building 10. For example, the HVAC unit 12 may include one or more heat exchangers across which an air flow is passed to condition the air flow before the air flow is supplied to the building. In the illustrated embodiment, the HVAC unit 12 is a rooftop unit (RTU) that conditions a supply air stream, such as environmental air and/or a return air flow from the building 10. After the air is conditioned, then HVAC unit 12 may supplied the conditioned air to the building 10 via ductwork 14 extending throughout the building 10 from the HVAC unit 12. For example, the ductwork 14 may extend to various individual floors or other sections of the building 10. In some embodiments, the HVAC unit 12 may be a heat pump that provides both heating and cooling to the building 10, for example, with one refrigeration circuit implemented to operate in multiple different modes. In other embodiments, the HVAC unit 12 may include one or more refrigeration circuits for cooling an air stream and a furnace for heating the air stream.

A control device 16, one type of which may be a thermostat, may be used to designate the temperature of the conditioned air. The control device 16 also may be used to control the flow of air through the ductwork 14. For example, the control device 16 may be used to regulate operation of one or more components of the HVAC unit 12 or other components, such as dampers and fans, within the building 10 that may control flow of air through and/or from the ductwork 14. In some embodiments, other devices may be included in the system, such as pressure and/or temperature transducers or switches that sense the temperatures and pressures of the supply air, return air, and/or the like. Moreover, the control device 16 may include computer systems that are integrated with or separate from other building control or monitoring systems, and even systems that are remote from the building 10.

Figure 2:
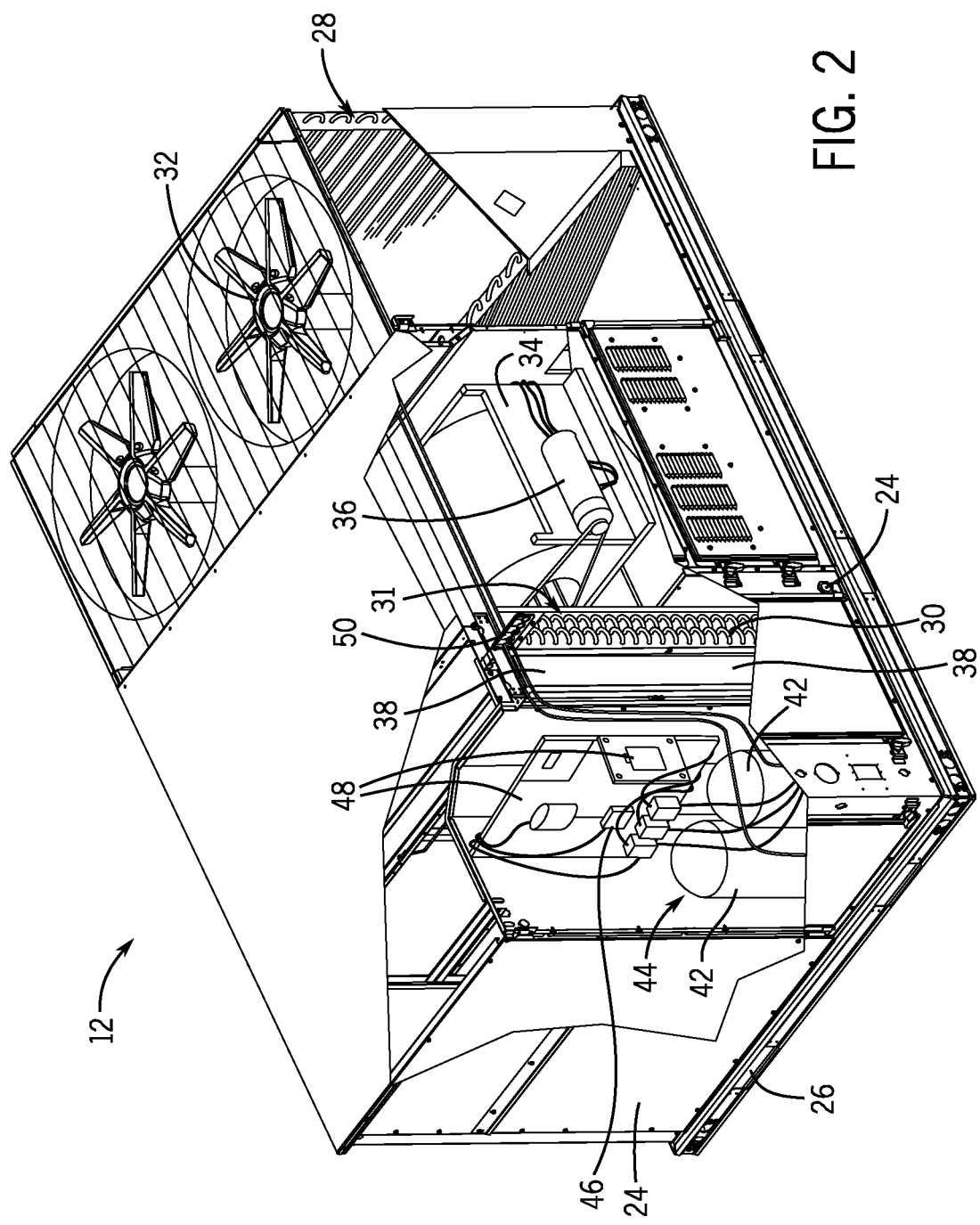
FIG. 2 is a perspective view of a HVAC unit of the HVAC system of FIG. 1, in accordance with an embodiment of the present disclosure.

FIG. 2 is a perspective view of an embodiment of the HVAC unit 12. In the illustrated embodiment, the HVAC unit 12 is a single package unit that may include one or more independent refrigeration circuits and components that are tested, charged, wired, piped, and ready for installation. The HVAC unit 12 may provide a variety of heating and/or cooling functions, such as cooling only, heating only, cooling with electric heat, cooling with dehumidification, cooling with gas heat, and/or cooling with a heat pump. As described above, the HVAC unit 12 may directly cool and/or heat an air stream provided to the building 10 to condition a space in the building 10.

As shown in the illustrated embodiment of FIG. 2, a cabinet 24 encloses the HVAC unit 12 and provides structural support and protection to the internal components from environmental and other contaminants. In some embodiments, the cabinet 24 may be constructed of galvanized steel and insulated with aluminum foil faced insulation. Rails 26 may be joined to the bottom perimeter of the cabinet 24 and provide a foundation for the HVAC unit 12. In certain embodiments, the rails 26 may provide access for a forklift and/or overhead rigging to facilitate installation and/or removal of the HVAC unit 12. In some embodiments, the rails 26 may fit into "curbs" on the roof to enable the HVAC unit 12 to provide air to the ductwork 14 from the bottom of the HVAC unit 12 while blocking elements such as rain from leaking into the building 10.

The HVAC unit 12 includes heat exchangers 28 and 30 in fluid communication with one or more refrigeration circuits. Tubes within the heat exchangers 28 and 30 may circulate refrigerant, such as R-410A, through the heat exchangers 28 and 30. The tubes may be of various types, such as multichannel tubes, conventional copper or aluminum tubing, and/or the like. Together, the heat exchangers 28 and 30 may implement a thermal cycle in which the refrigerant undergoes phase changes and/or temperature changes as it flows through the heat exchangers 28 and 30 to produce heated and/or cooled air. For example, the heat exchanger 28 may function as a condenser where heat is released from the refrigerant to ambient air, and the heat exchanger 30 may function as an evaporator where the refrigerant absorbs heat to cool an air stream. In other embodiments, the HVAC unit 12 may operate in a heat pump mode where the roles of the heat exchangers 28 and 30 may be reversed. That is, the heat exchanger 28 may function as an evaporator and the heat exchanger 30 may function as a condenser. In further embodiments, the HVAC unit 12 may include a furnace for heating the air stream that is supplied to the building 10. While the illustrated embodiment of FIG. 2 shows the HVAC unit 12 having two of the heat exchangers 28 and 30, in other embodiments, the HVAC unit 12 may include one heat exchanger or more than two heat exchangers.

The heat exchanger 30 is located within a compartment 31 that separates the heat exchanger 30 from the heat exchanger 28. Fans 32 draw air from the environment through the heat exchanger 28. Air may be heated and/or cooled as the air flows through the heat exchanger 28 before being released back to the environment surrounding the rooftop unit 12. A blower assembly 34, powered by a motor 36, draws air through the heat exchanger 30 to heat or cool the air. The heated or cooled air may be directed to the building 10 by the ductwork 14, which may be connected to the HVAC unit 12. Before flowing through the heat exchanger 30, the conditioned air flows through one or more filters 38 that may remove particulates and contaminants from the air. In certain embodiments, the filters 38 may be disposed on the air intake side of the heat exchanger 30 to reduce likelihood of contaminants contacting the heat exchanger 30.

The HVAC unit 12 also may include other equipment for implementing the thermal cycle. Compressors 42 increase the pressure and temperature of the refrigerant before the refrigerant enters the heat exchanger 28. The compressors 42 may be any suitable type of compressors, such as scroll compressors, rotary compressors, screw compressors, or reciprocating compressors. In some embodiments, the compressors 42 may include a pair of hermetic direct drive compressors arranged in a dual stage configuration 44. However, in other embodiments, any number of the compressors 42 may be provided to achieve various stages of heating and/or cooling. As may be appreciated, additional equipment and/or devices may be included in the HVAC unit 12, such as a solid-core filter drier, a drain pan, a disconnect switch, an economizer, pressure switches, phase monitors, and humidity sensors, among other things.

The HVAC unit 12 may receive electrical power via a terminal block 46. For example, a high voltage power source may be connected to the terminal block 46 to power the equipment. The operation of the HVAC unit 12 may be governed or regulated by a control board 48. The control board 48 may include control circuitry connected to a thermostat, a sensor, and/or an alarm. One or more of these components may be referred to herein separately or collectively as the control device 16. The control circuitry may be implemented to control operation of the equipment, provide alarms, and/or monitor safety switches. Wiring 50 may connect the control board 48 and the terminal block 46 to the equipment of the HVAC unit 12.

Figure 3:
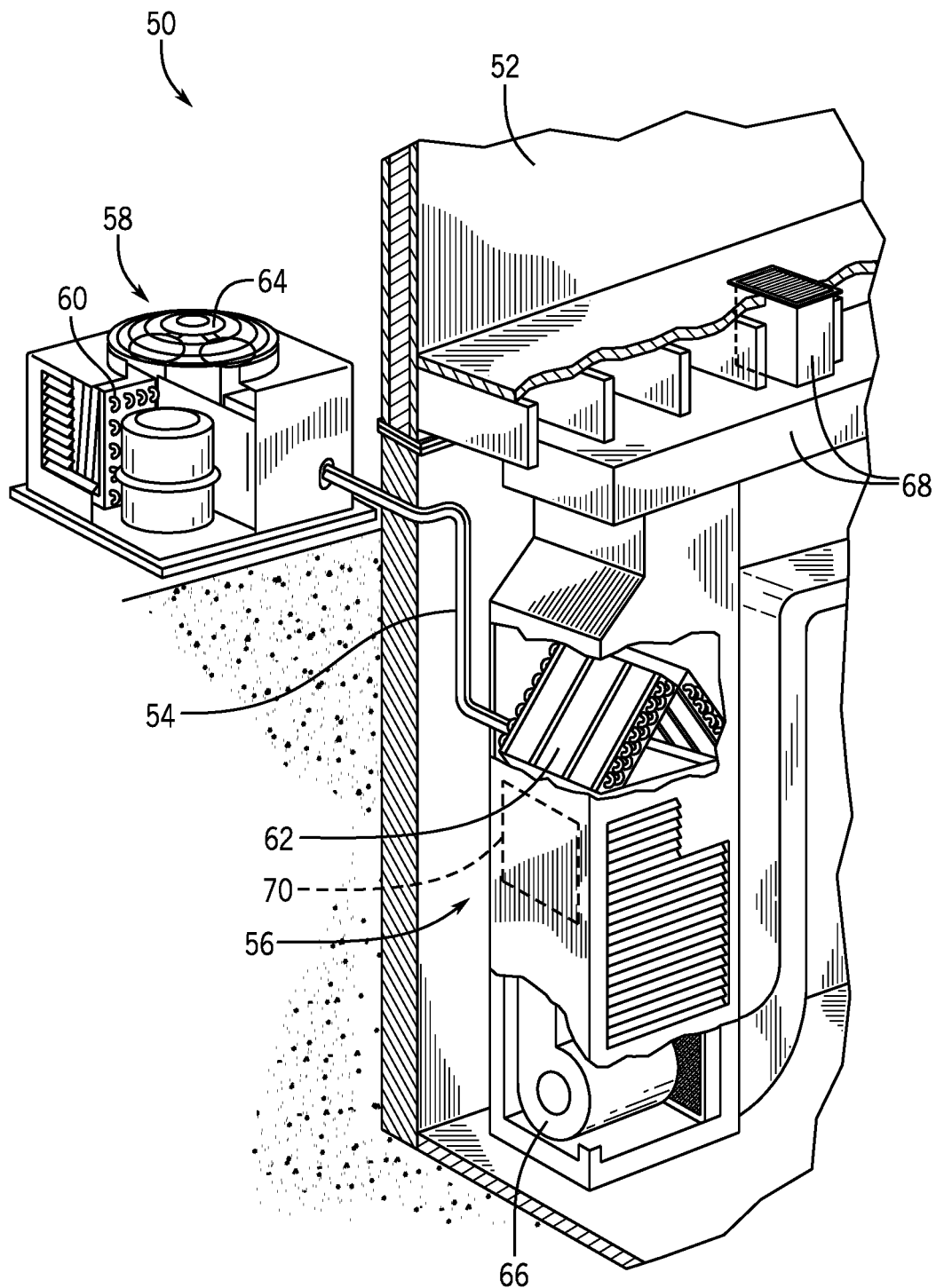
FIG. 3 illustrates a residential heating and cooling system, in accordance with an embodiment of the present disclosure.

FIG. 3 illustrates a residential heating and cooling system 50, also in accordance with present techniques. The residential heating and cooling system 50 may provide heated and cooled air to a residential structure, as well as provide outside air for ventilation and provide improved indoor air quality (IAQ) through devices such as ultraviolet lights and/or air filters. In the illustrated embodiment, the residential heating and cooling system 50 is a split HVAC system. In general, a residence 52 conditioned by a split HVAC system may include refrigerant conduits 54 that operatively couple the indoor unit 56 to the outdoor unit 58. The indoor unit 56 may be positioned in a utility room, an attic, a basement, and so forth. The outdoor unit 58 is typically situated adjacent to a side of residence 52 and is covered by a shroud to protect the system components and to prevent leaves and other debris or contaminants from entering the unit. The refrigerant conduits 54 may transfer refrigerant between the indoor unit 56 and the outdoor unit 58, typically transferring primarily liquid refrigerant in one direction and primarily vaporized refrigerant in an opposite direction.

When the system shown in FIG. 3 is operating as an air conditioner, a heat exchanger 60 in the outdoor unit 58 serves as a condenser for re-condensing vaporized refrigerant flowing from the indoor unit 56 to the outdoor unit 58 via one of the refrigerant conduits 54. In these applications, a heat exchanger 62 of the indoor unit functions as an evaporator. Specifically, the heat exchanger 62 receives liquid refrigerant, which may be expanded by an expansion device, and evaporates the refrigerant before returning it to the outdoor unit 58.

The outdoor unit 58 draws environmental air through the heat exchanger 60 using a fan 64 and expels the air above the outdoor unit 58. When operating as an air conditioner, the air is heated by the heat exchanger 60 within the outdoor unit 58 exits the unit at a temperature higher than it entered. The indoor unit 56 includes a blower or fan 66 that directs air through or across the indoor heat exchanger 62, where the air is cooled when the system is operating in air conditioning mode. Thereafter, the air is passed through ductwork 68 that directs the air to the residence 52. The overall system operates to maintain a desired temperature as set by a system controller. When the temperature sensed inside the residence 52 is higher than the setpoint on the thermostat, or the setpoint plus a small amount, the residential heating and cooling system 50 may become operative to refrigerate or cool additional air for circulation through the residence 52. When the temperature reaches the setpoint, or the setpoint minus a small amount, the residential heating and cooling system 50 may stop the refrigeration cycle temporarily.

The residential heating and cooling system 50 may also operate as a heat pump. When operating as a heat pump, the roles of heat exchangers 60 and 62 are reversed. That is, the heat exchanger 60 of the outdoor unit 58 will serve as an evaporator to evaporate refrigerant and thereby cool air entering the outdoor unit 58 as the air passes over outdoor the heat exchanger 60. The indoor heat exchanger 62 will receive a stream of air blown over it and will heat the air by condensing the refrigerant.

In some embodiments, the indoor unit 56 may include a furnace system 70. For example, the indoor unit 56 may include the furnace system 70 when the residential heating and cooling system 50 is not implemented to operate as a heat pump. The furnace system 70 may include a burner assembly and heat exchanger, among other components, inside the indoor unit 56. Fuel is provided to the burner assembly of the furnace 70 where it is mixed with air and combusted to form combustion products. The combustion products may pass through tubes or piping in a heat exchanger, separate from heat exchanger 62, such that air directed by the blower 66 passes over the tubes or pipes and extracts heat from the combustion products. The heated air may then be routed from the furnace system 70 to the ductwork 68 for heating the residence 52.

Figure 4:
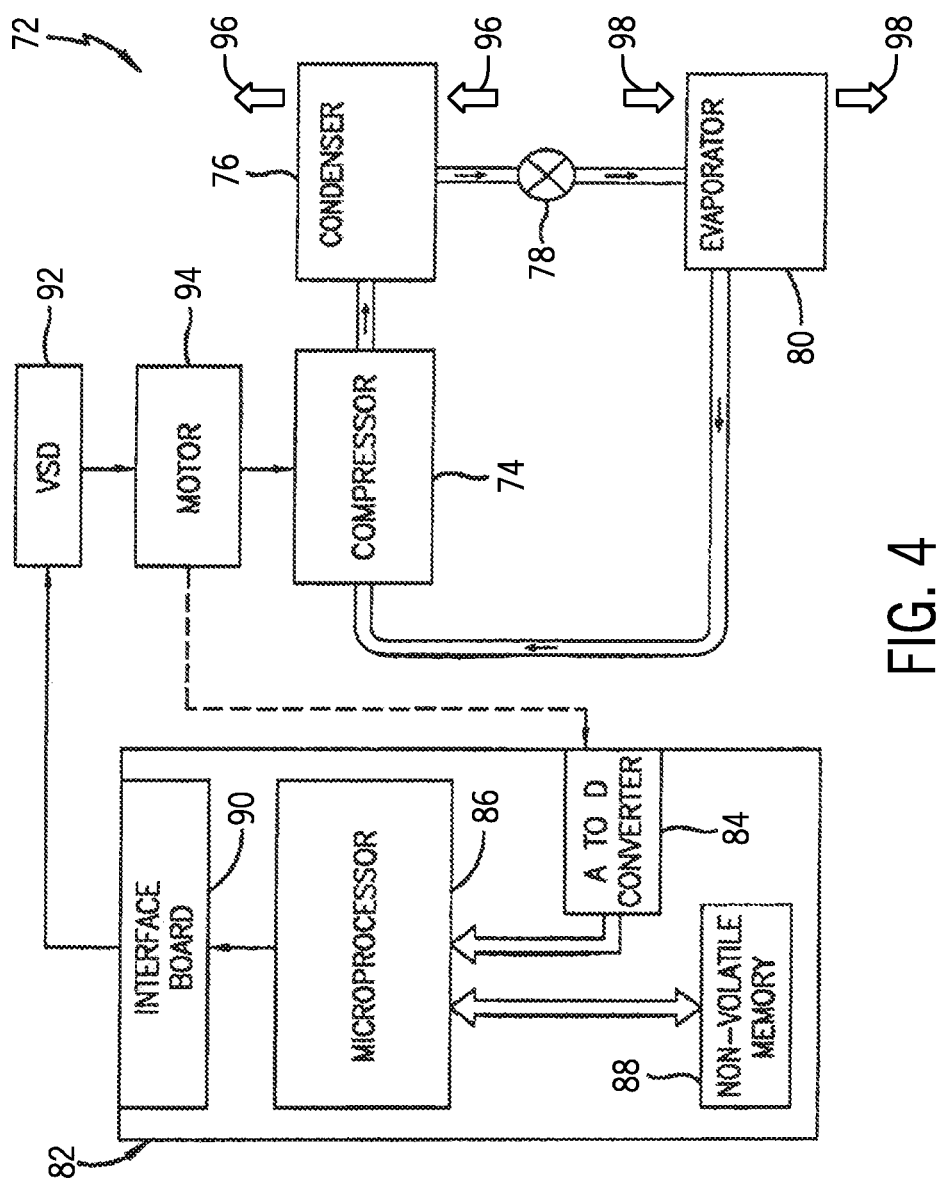
FIG. 4 illustrates a vapor compression system that may be used in the HVAC system of FIG.1 and in the residential heating and cooling system of FIG. 3, in accordance with an embodiment of the present disclosure.

FIG. 4 is an embodiment of a vapor compression system 72 that can be used in any of the systems described above. The vapor compression system 72 may circulate a refrigerant through a circuit starting with a compressor 74. The circuit may also include a condenser 76, an expansion valve(s) or device(s) 78, and an evaporator 80. The vapor compression system 72 may further include a control panel 82 that has an analog to digital (A/D) converter 84, a microprocessor 86, a non-volatile memory 88, and/or an interface board 90. The control panel 82 and its components may function to regulate operation of the vapor compression system 72 based on feedback from an operator, from sensors of the vapor compression system 72 that detect operating conditions, and so forth.

In some embodiments, the vapor compression system 72 may use one or more of a variable speed drive (VSDs) 92, a motor 94, the compressor 74, the condenser 76, the expansion valve or device 78, and/or the evaporator 80. The motor 94 may drive the compressor 74 and may be powered by the variable speed drive (VSD) 92. The VSD 92 may receive alternating current (AC) power having a particular fixed line voltage and fixed line frequency from an AC power source, and provide power having a variable voltage and frequency to the motor 94. In other embodiments, the motor 94 may be powered directly from an AC or direct current (DC) power source. The motor 94 may include any type of electric motor that can be powered by a VSD or directly from an AC or DC power source, such as a switched reluctance motor, an induction motor, an electronically commutated permanent magnet motor, or another suitable motor.

The compressor 74 compresses a refrigerant vapor and delivers the vapor to the condenser 76 through a discharge passage. In some embodiments, the compressor 74 may be a centrifugal compressor. The refrigerant vapor delivered by the compressor 74 to the condenser 76 may transfer heat to a fluid passing across the condenser 76, such as ambient or environmental air 96. The refrigerant vapor may condense to a refrigerant liquid in the condenser 76 as a result of thermal heat transfer with the environmental air 96. The liquid refrigerant from the condenser 76 may flow through the expansion device 78 to the evaporator 80.

The liquid refrigerant delivered to the evaporator 80 may absorb heat from another air stream, such as a supply air stream 98 provided to the building 10 or the residence 52. For example, the supply air stream 98 may include ambient or environmental air, return air from a building, or a combination of the two. The liquid refrigerant in the evaporator 80 may undergo a phase change from the liquid refrigerant to a refrigerant vapor. In this manner, the evaporator 38 may reduce the temperature of the supply air stream 98 via thermal heat transfer with the refrigerant. Thereafter, the vapor refrigerant exits the evaporator 80 and returns to the compressor 74 by a suction line to complete the cycle.

In some embodiments, the vapor compression system 72 may further include a reheat coil in addition to the evaporator 80. For example, the reheat coil may be positioned downstream of the evaporator 80 relative to the supply air stream 98 and may reheat the supply air stream 98 when the supply air stream 98 is overcooled to remove humidity from the supply air stream 98 before the supply air stream 98 is directed to the building 10 or the residence 52.

It should be appreciated that any of the features described herein may be incorporated with the HVAC unit 12, the residential heating and cooling system 50, or other HVAC system. Additionally, while the features disclosed herein are described in the context of embodiments that directly heat and cool a supply air stream provided to a building or other load, embodiments of the present disclosure may be applicable to other HVAC systems as well. For example, the features described herein may be applied to mechanical cooling systems, free cooling systems, chiller systems, or other heat pump or refrigeration applications.

The description above with reference FIGS. 1-4 is intended to be illustrative of the context of the present disclosure. The techniques of the present disclosure may update features of the description above. In particular, as will be discussed in more detail below, multiple control boards 48, such as control panels 82, may be implemented in the HVAC system, for example, to facilitate improving control granularity and/or to provide hierarchical control.

Figure 5:
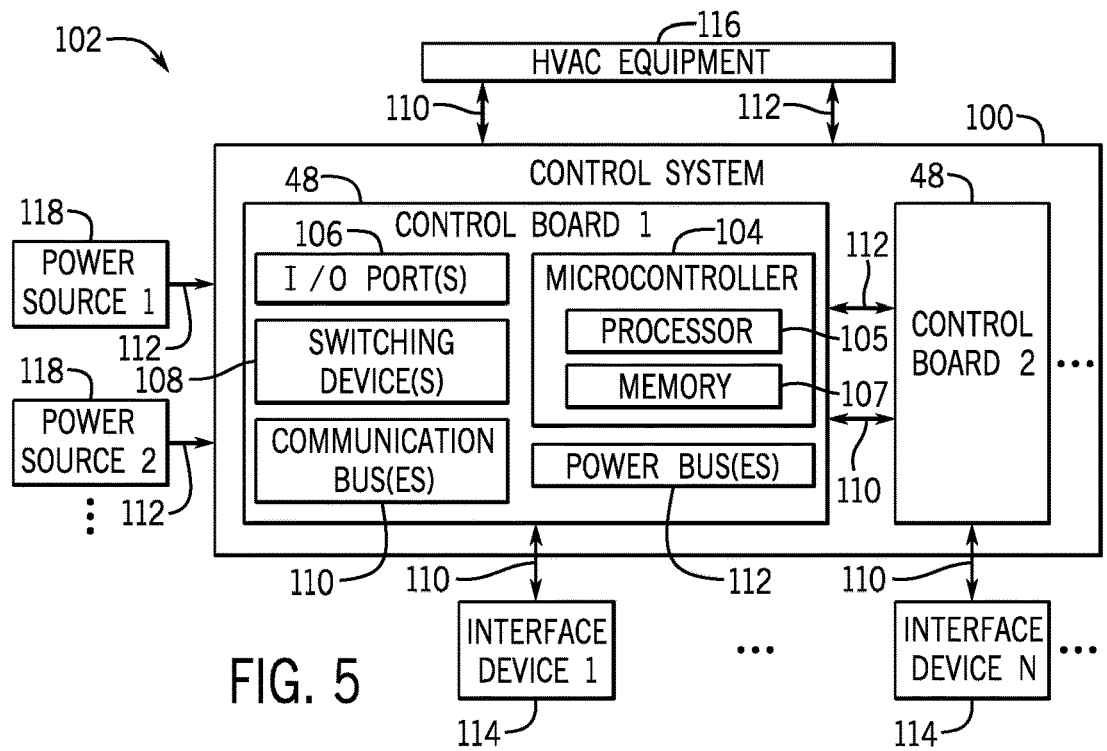
FIG. 5 is a block diagram of a portion of the HVAC system of FIG.1 including a control system implemented using one or more control boards, in accordance with an embodiment of the present disclosure.

To help illustrate, a control system 100 that includes multiple control boards 48, which may be used to facilitate controlling operation of equipment in an HVAC system 102, is shown in FIG. 5. Each control board 48 may include a microcontroller 104 and one or more input/output (I/O) ports 106, switching devices 108 (e.g., relays), communication buses 110, and power buses 112. The microcontroller 104 may include a processor 105, such as microprocessor 86, and memory 107, such as non-volatile memory 88, to facilitate controlling operation of the HVAC system 102.

For example, the microcontroller 104 may communicate control commands instructing the HVAC equipment 116, such as a VSD 92, to perform a control action, such as adjust speed of motor. In some embodiments, the microcontroller 104 may determine control commands based on user inputs received from an interface device 114 and/or operational parameters, such as speed, temperature, and/or pressure, indicated by the HVAC equipment 116, such as a sensor. Further, as described above, the HVAC equipment 116 and the interface devices 114 may each communicate using a communication protocol that may, for example, govern a data transmission rate and/or checksum data of transmitted data. However, at least in some instances, different HVAC equipment 116 and/or different interface devices 114 may be implemented to communicate using different communication protocols that may, for example, govern different data transmission rates and/or different checksum data implementations of transmitted data.

Thus, to facilitate controlling operation of the HVAC system 102, a control board 48 may include one or more I/O ports 106 that may enable the control board 48 to communicatively couple to an interface device 114, another control board 48, and/or HVAC equipment 116 via an external communication bus 110. In some embodiments, an external communication bus 110 may include one or more off-board connections, such as wires and/or cables. Additionally, the I/O ports 106 may communicatively couple to the microcontroller 104 via internal or on-board communication buses 110. In some embodiments, an internal communication bus 110 may include one or more on-board connections, such as PCB traces. In this manner, the communication buses 110 may enable the control board 48 to control operation of a device, such as an interface device 114, another control board 48, and/or HVAC equipment 116.

In some embodiments, the device may operate using electrical power. Thus, to facilitate controlling operation of a device, one or more of the I/O ports 106 on the control board 48 may also facilitate conducting electrical power (e.g., 24VAC) from power sources 118 to the device via power busses 112. For example, the control board 48 may receive electrical power from a power source 118, such as a transformer (e.g., an indoor transformer and/or an outdoor transformer), and/or another control board 48 via external power buses 112 coupled to an I/O port 106. Additionally or alternatively, the control board 48 may receive electrical power from a power source 118 and/or another control board 48 via external power buses 112 coupled to a power source input 130. In some embodiments, an external power bus 112 may include one or more off-board connections. Additionally, the control board 48 may output electrical power to HVAC equipment 116 and/or another control board 48 via additional external power buses 112 coupled to its I/O ports 106. The control board 48 may also route electrical power between its I/O ports 106 and/or between its I/O ports 106 and the power source input 130 via internal power buses 112. In some embodiments, an internal power bus 112 may include one or more on-board connections.

Each of the power sources 118 and/or control boards 48 coupled to a power source input 130 may provide electrical power with certain power parameters (e.g., voltage, current, phase, and/or the like). Accordingly, in some embodiments, a first power source 118, such as an indoor transformer, may provide 24 VAC electrical power with zero phase-offset, and a second power source 118, such as an outdoor transformer, may provide 24 VAC with a 90 degree phase-offset. Further, in some embodiments, the first power source 118 may provide 24 VAC electrical power with zero phase-offset, and the second power source 118 may provide 24 VAC electrical power with 90 degree phase-offset. As such, the control board 48 may receive electrical power having respective power parameters from a number of power sources 118 and/or control boards 48.

Further, as the control board 48 may simultaneously receive electrical power from multiple different power sources 118 and/or additional control boards 48, the control board 48 may use the switching device 108 (e.g., latching device) to electrically isolate the electrical powers supplied by different power sources 118, for example, to facilitate improving communication quality. In particular, when electrical power output from two power sources 118 is out of phase relative to one another, routing the electrical powers through the control board 48 in close proximity or within the same internal busses 112 may result in cross talk and/or phantom voltages. That is, for example, in cases where electrical power of a first power source 118 has a first phase as a power parameter and electrical power of a second power source 118 has a second phase that is different from the first phase as a power parameter, the electrical powers may create undesired effects in certain regions of the control board 48 and/or induce voltages in wires and/or components, which may result in unpredictable behavior in the control board 48 and/or in a device coupled to the control board 48. Accordingly, the switching device 108 may switch between the power buses 112 coupled to the power sources 118 to isolate the electrical powers received from each power source 118 and reduce, thereby reducing likelihood of producing undesired effects (e.g., cross talk, phantom voltages, and/or the like) that may result from competing electrical powers (e.g., electrical powers from different power sources 118) that are not electrically isolated.

By supporting multiple control boards 48, the responsibilities of the control system 100 may be segregated. That is, a first control board 48 may handle certain responsibilities, such as communicating with a first interface device 114 and HVAC equipment 116 corresponding with a first building zone, while a second control board 48 may handle other responsibilities, such as communicating with a second interface device 114 and HVAC equipment 116 corresponding with a second building zone. As such, the control system 100 may improve control granularity, as each control board 48 may handle a dedicated subset of responsibilities instead of all of the responsibilities of the control system 100. Further, the control boards 48 may communicatively couple to one another so that relevant information regarding related responsibilities and/or tasks may be shared. In some embodiments, for example, the first control board 48 may receive and process a request, such as a temperature setpoint, from the interface device 114, such as a thermostat, and the second control board 48 may use information processed by the first control board 48 to control the HVAC equipment 116, such as VSD 92. As such, each control board 48 may be implemented to handle a different set of responsibilities and to communicate with other control boards 48, as will be described in further detail.

Further, in some embodiments, the control boards 48 may be coupled to facilitate implemented a control hierarchy. For example, a first control board 48 may operate as a master to a subordinate control board 48. In some embodiments, the master control board 48 may handle coordination with and between subordinate control boards 48. The subordinate control board 48 may receive instruction from the master control board 48 and control a set of devices accordingly. Further, in some embodiments, as will be described in further detail below, the master control board 48 may handle a subset of responsibilities, the subordinate control board 48 may handle a different subset of responsibilities, and each control board 48 may dynamically change between operating as a master control board 48 or a subordinate control board 48.

Figure 6:
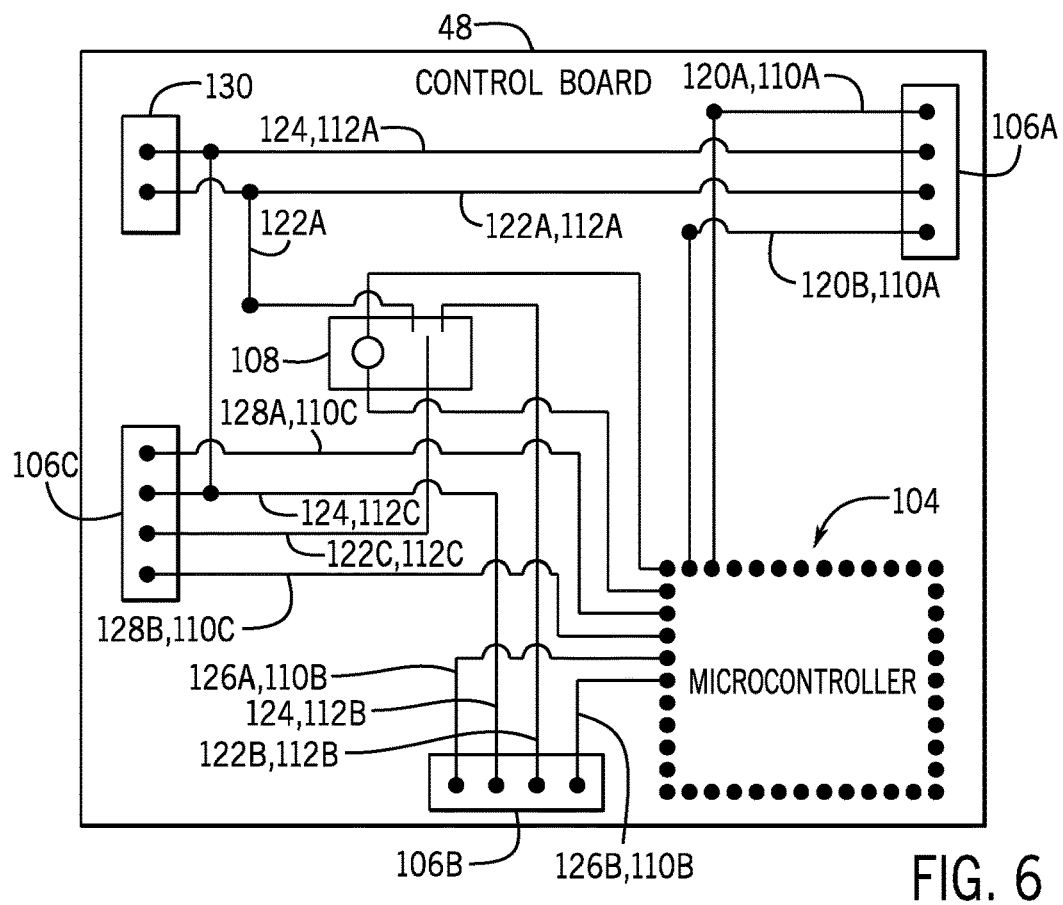
FIG. 6 is a schematic diagram of an example control board implemented in the control system of FIG. 5, in accordance with an embodiment of the present disclosure.

To help illustrate, an example of a control board 48, which may be implemented in a control system 100, is shown in FIG. 6. In the illustrated embodiment, the control board 48 includes a first I/O port 106A. The first I/O port 106A includes connections for a first communication wire 120A, such as a trace, and a second communication wire 120B. In some embodiments, the first communication wire 120A may provide data communication from the first I/O port 106A to the microcontroller 104, while the second communication wire 120B provides data communication from the microcontroller 104 to the first I/O port 106A, thereby enabling data communication between the microcontroller 104 and a first device coupled to the first I/O port 106A. The first device may, for example, be an interface device 114, another control board 48, or HVAC equipment 116.

In other words, the first communication wire 120A and the second communication wire 120B may be formed on the control board 48 to implement a first communication bus 110A. In some embodiments, data communication on the first communication bus 110A may be in accordance with a first communication protocol. That is, the microcontroller 104 may output data to and expect to receive data from the first communication bus 110A that adheres to a communication protocol, which may specify a first data transmission rate and/or a first checksum implementation, among other things.

The first I/O port 106A further includes a connection for a first power wire 122A and a common wire 124. In some embodiments, the first power wire 122A may supply electrical power, such as 24VAC power, from a power source input 130 to the first I/O port 106A, while the common wire 124 may supply a common or ground signal. In other words, the first power wire 122A and the common wire 124 may be formed on the control board 48 to implement a first power bus 112A. In some embodiments, the first power bus 112A may conduct electrical power in accordance with first electrical power parameters from a first power source 118 coupled to the power source input 130 to a first device, such as an interface device 114, another control board 48, or HVAC equipment 116, coupled to the first I/O port 106A.

In this manner, the first I/O port 106A may facilitate interfacing the control board 48 with a first device that supports the first communication protocol and/or is designed to operate using electrical power with first power parameters from the first power source 118. That is, the microcontroller 104 may successfully communicate with the first device via the first I/O port 106A when the first device supports the first communication protocol. Additionally, the control board 48 may route electrical power with its target parameters to the first device via the first I/O port 106A when the first device is designed to operate using electrical power from the first power source 118.

The control board 48 also includes a second I/O port 106B with connections for a first communication wire 126A and a second communication wire 126B. In some embodiments, the first communication wire 126A may provide data communication from the second I/O port 106B to the microcontroller 104, while the second communication wire 126B provides data communication from the microcontroller 104 to the second I/O port 106B, thereby enabling data communication between the microcontroller 104 and a second device, such as an interface device 114, another control board 48, or HVAC equipment 116, coupled to the second I/O port 106B.

In other words, the first communication wire 126A and the second communication wire 126B may be formed on the control board 48 to implement a second communication bus 110B. In some embodiments, data communication on the second communication bus 110B may be in accordance with a second communication protocol different from the first communication protocol. That is, the microcontroller 104 may output data to and expect to receive data from the second communication bus 110B that adheres to a second communication protocol, which specifies a second data rate different from the first data rate and/or a second checksum implementation different from the first checksum implementation, among other things.

The second I/O port 106B further includes connections for a second power wire 122B and the common wire 124. In some embodiments, the second power wire 122B may supply electrical power with second power parameters, such as 24VAC with different phase compared to the first power wire 122A, from a power source input 130 to the second I/O port 106B, while the common wire 124 may supply a common signal. In other words, the second power wire 122B and the common wire 124 may be formed on the control board 48 to implement a second power bus 112B. In some embodiments, the second power bus 112B may conduct electrical power from a second power supply 118 coupled to the power source input 130 and/or from another control board 48 to a second device coupled to the second I/O port 106B.

In this manner, the second I/O port 106B may facilitate interfacing the control board 48 with a second device, such as an interface device 114, another control board 48, or HVAC equipment 116, that supports the second communication protocol and/or is designed to output electrical power (e.g., operate as a power source 118). That is, the microcontroller 104 may successfully communicate with the second device via the second I/O port 106B when the second device supports the second communication protocol. Additionally, the control board 48 may route electrical power to and/or from the second device to implement the second power bus 112B.

In other words, the control board 48 may support one set of devices via the first I/O port 106A and a different set of devices via the second I/O port 106B. However, in some embodiments, the control system 100 may support dynamic reconfiguration of the control boards 48 and dynamic interchanges of devices, such as an interface device 114, HVAC equipment 116, and a power source 118. For example, when the control system 100 is implemented using multiple control boards 48, a master control board 48 may become a subordinate control board 48 or vice versa and, thus, responsibilities of the control board 48 may dynamically be altered.

To that end, such control boards 48 may facilitate improving operational flexibility and/or reduced implementation cost of the control system 100. That is, because the control board 48 allows dynamic changes between devices, communication buses 110, and power buses 112, the control system 100 may provide compatibility with a wider range of devices, control system 100 configurations, and/or HVAC system 102 configurations. Furthermore, the control system 100 may utilize a smaller physical footprint and reduced implementation costs because of the increased operational flexibility of the control boards 48. That is, the control system 100 may implement a solution with fewer resources.

As such, in order to facilitate dynamic compatibility with a device in terms of a supported communication protocol and/or power supplies 118, the control board 48 may include a switchable I/O port 106C. That is, the control board 48 may include a switchable I/O port 106C that supports dynamic reconfiguration of the control board 48 and the dynamic interchange of devices supporting various communication protocols and/or power sources 118 by dynamically implementing a suitable communication protocol and/or dynamically routing electrical power from a suitable power supply 118. As such, the switchable I/O port 106C may be equipped to implement a number of communication protocols and electrical power supplies. Though, at a given time, the switchable I/O port 106C may only actively implement a single communication protocol and electrical power.

The switchable I/O port 106C includes connections for a first communication wire 128A and a second communication wire 128B to implement a switchable communication bus 110C. In some embodiments, the switchable communication bus 110C may switchably implement any number of communication protocols, such as the first communication protocol or the second communication protocol, as will be described in further detail below. The switchable I/O port 106C further includes connections for a third power wire 122C and the common wire 124 to implement a switchable power bus 112C. In some embodiments, the switchable power bus 112C may be selectively coupled to any number of power buses 112 in order to conduct an electrical power supply from a suitable power supply 118 and/or from an additional control board 48.

While the first communication bus 110A and the second communication bus 110B are discussed with reference to the illustrated embodiment. It should be noted that embodiments of the control board 48 may support any suitable number of communication buses 110. Additionally, control board 48 and/or I/O port 106 may support any number of wires to facilitate implementing a corresponding communication bus 110. The control board 48 may further support any suitable number of power buses 112. Further, the control board 48 and/or I/O port 106 may support any number of wires to facilitate implementing a corresponding power bus 112. Therefore, the embodiments of the present disclosure should be interpreted as illustrative and not limiting.

While the illustrated embodiment of the control board 48 includes a single switchable I/O port 106C, it should be noted that the control board 48 may include any suitable number of switchable I/O ports 106C. As such, the control board 48 may be equipped to handle the simultaneous interchange of multiple devices and to that end, in some embodiments, each of the I/O ports 106 of the control board 48 may be switchable I/O ports 106C. That is, each of the I/O ports 106 on the control board 48 may support the interchange of devices supporting different communication buses 110 and/or power buses 112.

Figure 7:
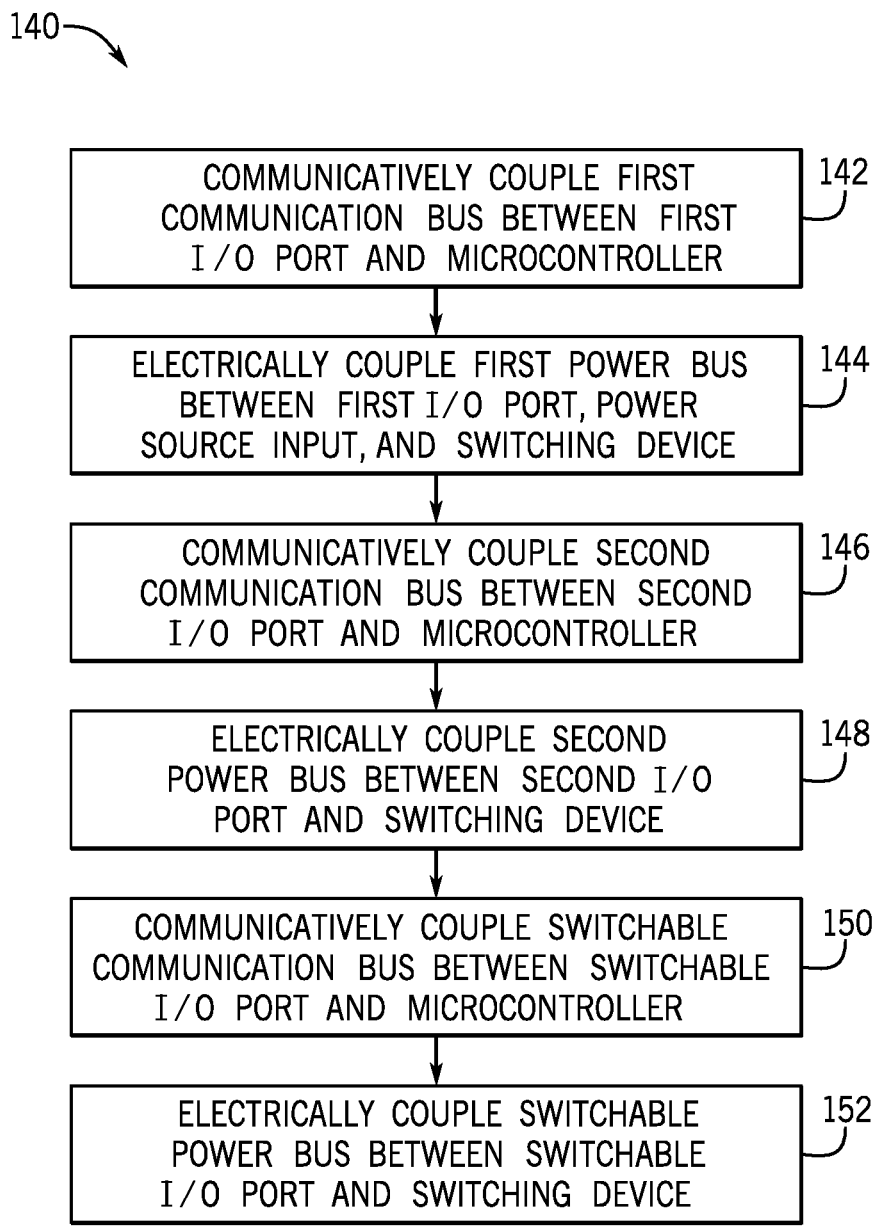
FIG. 7 is a flow diagram of a process for implementing the control board of FIG. 6, in accordance with an embodiment of the present disclosure.

In any case, an example of a process 140 for implementing a control board 48 is described in FIG. 7. Although the following description of the process 140 is described in a particular order, which represents a particular embodiment, it should be noted that the process 140 may be performed in any suitable order. Moreover, embodiments of the process 140 may omit process blocks and/or include suitable additional process blocks.

Generally, the process 140 includes communicatively coupling a first communication bus between a first I/O port and a microcontroller 104, as indicated by process block 142, electrically coupling a first power bus between the first I/O port, a power source input 130, and a switching device 108, as indicated by process block 144, communicatively coupling a second communication bus between a second I/O port and the microcontroller 104, as indicated by process block 146, electrically coupling a second power bus between the second I/O port and the switching device 108, as indicated by process block 148, communicatively coupling a switchable communication bus between a switchable I/O port and the microcontroller 104, as indicated by process block 150, and electrically coupling a switchable power bus between the switchable I/O port and the switching device 108, as indicated by process block 152. In some embodiments, the process 140 may be implemented at least in part by a manufacturer and/or a system integrator of the control system 100 and/or the HVAC system 102.

In any case, as illustrated in FIG. 6, communicatively coupling the first communication bus 110A between the first I/O port 106A and the microcontroller 104, as indicated by process block 142, may involve coupling the first communication wire 120A and the second communication wire 120B between the first I/O port 106A and the microcontroller 104. Further, to enable successful communication over the first communication wire 120A and the second communication wire 120B, the microcontroller 104 may recognize that the first I/O port 106A is suitable for implementing the first communication protocol. That is, the microcontroller 104 may maintain a map of addresses in software of each of the communication connections included in the I/O ports 106 to a suitable communication protocol supported by the I/O port 106. The communication connections may include, for example, the first communication wire 120A, the second communication wire 120B, the first communication wire 126A, the second communication wire 126B, the first communication wire 128A, and the second communication wire 128B. Further, in some embodiments, each communication protocol may include a separate mapping of addresses in software for their respective connections.

As such, coupling the first communication bus 110A between the first I/O port 106A and the microcontroller 104 may involve updating a mapping of addresses of the first communication protocol connections to include the connections of the first I/O port 106A. The microcontroller 104 may then transmit and receive data according to a first communication protocol, such as Modbus protocol. That is, for example, the microcontroller 104 may transmit data using a first data rate associated with the first communication protocol, include a first checksum implementation associated with the first communication protocol in transmitted data, expect to received data at the first data rate, and/or perform error detection by processing received data based on the first checksum implementation. Accordingly, a device coupled to the first I/O port 106A that transmits and receives data via the first communication bus 110A may successfully communicate with the control board 48 in accordance with a first communication protocol.

As such, in some embodiments, using the first communication bus 110A, the microcontroller 104 may receive a request from a device and may control operation of the HVAC system 102 based on the request. That is, for example, the microcontroller 104 may receive a temperature setpoint from an interface device 114 via a first communication bus 110A and may transmit a suitable command to the interface device 114 and/or an additional device in response. To continue with the example, a response sent to an additional device may include instructions sent, via the first communication bus 110A, to HVAC equipment 116 to satisfy the request. For example, the instructions may be instructions sent to the VSD 92 to increase the speed of the motor 94 until the temperature setpoint is reached. The microcontroller 104 may further communicate a response to the interface device 114 to confirm that the request has been received and/or implemented. Further, the data transmitted over the first communication bus 110A may be communicated according to the first communication protocol.

Additionally, in some embodiments, the microcontroller 104 may transmit the request to an additional control board 48 that is equipped to handle the request. In such embodiments, for example, a first or master control board 48 may be communicatively coupled to the interface device 114 while a second or subordinate control board 48 is communicatively coupled to the HVAC equipment 116, which may fulfills the request from the interface device 114. As such, the first control board 48 may receive the request from the interface device 114 and communicate instructions to the second control board 48 to control the HVAC equipment 116.

Electrically coupling the first power bus 112A between the first I/O port 106A, the power source input 130, and the switching device 108, as indicated by process block 144, may involve coupling the first power wire 122A and the common wire 124 from the power source input 130 to the first I/O port 106A. Further, the first power wire 122A and the common wire 124 may be couple to the switching device 108, as will be discussed further. As described above, a power source 118 may be coupled to the control board 48 via the power source input 130. As such, the first power wire 122A and the common wire 124 may route electrical power from a power source 118 to a device connected to the first I/O port 106A. For example, a transformer connected to the power source input 130 may provide a supply voltage and a common voltage via the first power wire 122A and the common wire 124 of the first power bus 112A, respectively, to an interface device 114, such as a thermostat, connected to the first I/O port 106A.

Communicatively coupling a second communication bus 110B between a second I/O port 106B and the microcontroller 104, as indicated by process block 146, may involve coupling the first communication wire 126A and the second communication wire 126B between the second I/O port 106B and the microcontroller 104. To enable successful communication over the first communication wire 126A and the second communication wire 126B, the microcontroller 104 may update the mapping of addresses in software of connections suitable to implement the second communication protocol to include the first communication wire 126A and the second communication wire 126B. The microcontroller 104 may then transmit and receive data according to a second communication protocol that may involve a second data rate and/or a second checksum implementation. Accordingly, the microcontroller 104 may transmit and receive data from a device coupled to the second I/O port 106B via the second communication bus 110B in accordance with the second communication protocol.

As such, the control board 48 may support a different set of devices than those that support the first communication bus 110A. That is, for example, the microcontroller 104 on a subordinate control board 48 may receive instructions from a master control board 48 and, in response, control operation of a device via the second communication bus 110B in accordance with the second communication protocol. For example, the subordinate control board 48 may receive instructions from a master control board 48 to increase the speed of the VSD 92 in order to produce a lower temperature in the HVAC system 102 and may communicate these instructions to the VSD 92 via the second communication bus 110B.

Electrically coupling a second power bus 112B between the second I/O port 106B and the switching device 108 as indicated by process block 148, may involve coupling the second power wire 122B from the second I/O port 106B to the switching device 108. Additionally, the common wire 124 may be coupled between the power source input 130 and the second I/O port 106B, thereby providing a common signal across the control board 48. In some embodiments, the second power bus 112B may additionally couple the second I/O port 106B to another power source input 130, for example, implemented on the same control board 48 or a different control board 48. In any case, this may enable the second power bus 112B to conduct electrical power from a different power source 118 than the first power bus 112A, for example, such that the first power bus 112A and the second power bus 112B conduct electrical power with different parameters, such as current, voltage, phase, and/or frequency.

Communicatively coupling a switchable communication bus 110C between a switchable I/O port 106C and the microcontroller 104, as indicated by process block 150, may involve coupling the first communication wire 128A and the second communication wire 128B between the switchable I/O port 106C and the microcontroller 104. Further, to enable successful communication over the first communication wire 128A and the second communication wire 128B, the microcontroller 104 may switchably transmit and receive data via any one of multiple possible communication protocols. For example, the switchable communication bus 110C may switchably select between supporting the first communication protocol of the first communication bus 110A or the second communication protocol of the second communication bus 110B. In other words, when a first device compatible with the first communication bus 110A is coupled to the switchable I/O port 106C, the switchable communication bus 110C may implement the first communication protocol to facilitate data communication between the first device and the microcontroller 104. On the other hand, when a second device compatible with the second communication bus 110B is coupled to the switchable I/O port 106C, the switchable communication bus 110C may implement the second communication protocol to facilitate data communication between the second device and the microcontroller 104.

As described above, to facilitate switching between different communication protocols, the microcontroller 104 may adjust mapping of the switchable I/O port 106C to an appropriate communication protocol. Additionally or alternatively, the microcontroller 104 may adjust data transmission rate, checksum data included in transmitted data, and/or error check processing of received data based on a selected communication protocol. Accordingly, the switchable port I/O 106C may provide flexibility to the control system 100, by providing data communication compatibility with a number of different devices.

Electrically coupling a switchable power bus 112C between the switchable I/O port 106C and the switching device 108, as indicated by process block 152, may involve coupling the third power wire 122C from the switching device 108 to the switchable I/O port 106C. Additionally, the common wire 124 may be coupled between the power source input 130 and the switchable I/O port 106C. As described above, the common wire 124 may also be coupled to the first I/O port 106A and the second I/O port 106B and, thus, provides a common signal across the control board 48.

In any case, by coupling the switchable power bus 112C to the switching device 108, the switchable power bus 112C may selectively provide or route electrical power from a number of different power supplies 118 to the switchable I/O port 106C. That is, the switching device 108 may switch between signals received from different power supplies 118. For example, the switchable power bus 112C may conduct electrical power having first power parameters along the third power wire 122C from a first power supply 118 or additional control board 48 when the switching device 108 selects the first power bus 112A. In such cases, the power supplied by third power wire 122C may match the power supplied by first power wire 122A. Further, when the switching device 108 selects the second electrical power supply, as is delivered along the second power wire 122B, the switchable power bus 112C may conduct electrical power having second power parameters along the third power wire 122C from a second power supply 118 or additional control board 48. In some embodiments, the switching device 108 may select a suitable electrical power supply based on a selection or control signal, for example, output from the microcontroller 104 to the switching device 108. To that end, the switchable I/O port 106C may selectively supply a suitable electrical power to a connected device via the switchable power bus 112C.

As the operational status of the control board 48 may dynamically change and/or the devices coupled to the control board 48 may interchange dynamically, the operation of the control board 48 may be updated to suitably support an operational status of and/or configuration of devices connected to the control board 48. To help illustrate, an example of a process 160 for operating a control board 48 is described in FIG. 8. In some embodiments, the process 160 may be implemented on start-up of the control system 100, reset of the control system 100, and/or following any change to the operational status or configuration of devices coupled to the control board 48. Further, although the following description of the process 160 is described in a particular order, which represents a particular embodiment, it should be noted that the process 160 may be performed in any suitable order. Moreover, embodiments of the process 160 may omit process blocks and/or include suitable additional process blocks.

Generally, the process 160 includes determining a target communication protocol to be implemented on a switchable communication bus 110C, as indicated by process block 162, determining whether the target communication protocol is a first communication protocol, as indicated by decision block 164, and, when the target communication protocol is the first communication protocol, communicatively coupling a switchable communication bus to a first communication bus, as indicated by process block 166, and electrically coupling a switchable power bus to a first power bus 112A, as indicated by process block 168. When the target communication protocol is not the first communication protocol, the process 160 includes communicatively coupling the switchable communication bus 110C to a second communication bus, as indicated by process block 170, and electrically coupling the switchable power bus to a second power bus 112B, as indicated by process block 172. In some embodiments, the process 160 may be implemented at least in part by executing instructions stored in a tangible, non-transitory, computer-readable medium, such as memory 107, using processing circuitry, such as processor 105.

Thus, in some embodiments, a control board 48 may determine a target communication protocol to be implemented on a switchable communication bus 110C communicatively coupled between its microcontroller 104 and a switchable I/O port 106C, as indicated by process block 162. As described above, devices may communicate using different communication protocols. Thus, in some embodiments, the control board 48 may determine the target communication protocol based on a communication protocol implemented by a device coupled to the switchable I/O port 106C. That is, the control board 48 may determine the communication protocol implemented on the communication bus 110 of a device connected to the switchable I/O port 106C to use the same communication protocol on the switchable communication bus 112C. Additionally or alternatively, the target communication protocol may be determined based on whether control board 48 is implemented as a master or a subordinate in a hierarchy of multiple control boards 48 in the control system 100.

Figure 9:
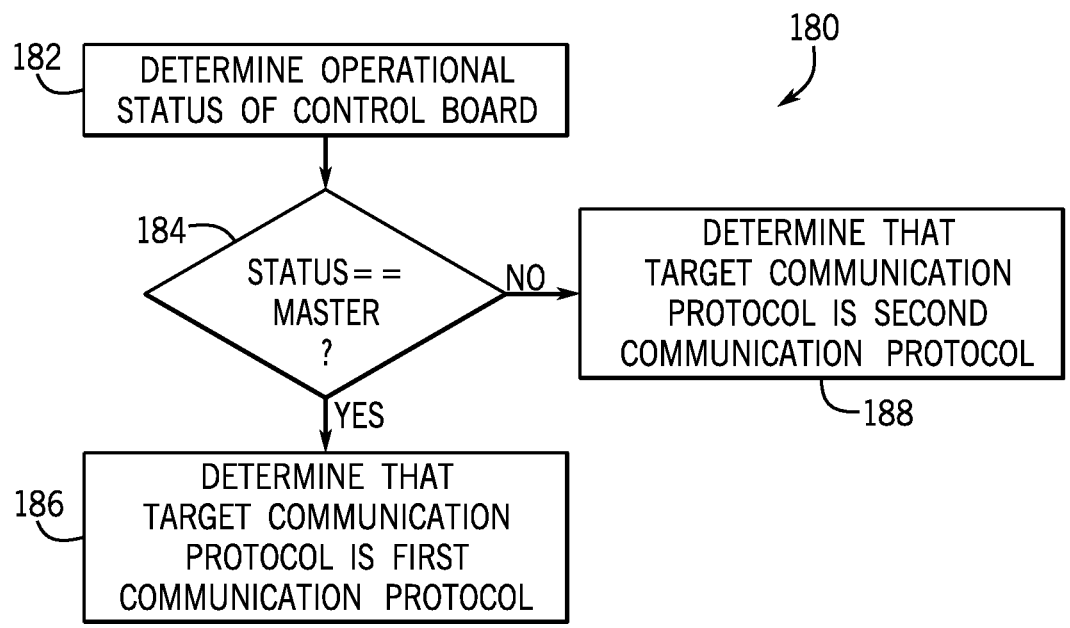
FIG. 9 is a flow diagram of a process for determining target communication protocol to be implemented on a switchable communication bus on the control board of FIG. 6, in accordance with an embodiment of the present disclosure.

To help illustrate, an example of a process 180 for determining a target communication protocol to be implemented on a switchable communication bus 110C is described in FIG. 9. Although the following description of the process 180 is described in a particular order, which represents a particular embodiment, it should be noted that the process 180 may be performed in any suitable order. Moreover, embodiments of the process 180 may omit process blocks and/or include suitable additional process blocks.

Generally, the process 180 includes determining an operational status of a control board 48, as indicated by process block 182, determining whether the operational status is a master operational status, as indicated by decision block 184, and, when the operational status is the master operational status, determining that target communication protocol is a first communication protocol, as indicated by process block 186. When the operational status is not the master operational status, the process 180 includes determining that the target communication protocol is a second communication protocol, as indicated by process block 188. In some embodiments, the process 180 may be implemented at least in part by executing instructions stored in a tangible, non-transitory, computer-readable medium, such as memory 107, using processing circuitry, such as processor 105.

Thus, in some embodiments, a control board 48 may determine its operational status, as indicated by process block 182. In some embodiments, operational status of the control board 48 may be indicated via a flag, register, configuration data, variable, and/or the like stored in a tangible, non-transitory, computer-readable medium. Thus, in such embodiments, the control board 48 may determine its operational status by polling the tangible, non-transitory, computer-readable medium. For example, the microcontroller 104 may determine the operational status of the control board 48 by accessing and/or reading a value from a specified location, such as address in memory 107, on the control board 48 that is representative of the control board's 48 operational status.

Determining whether the operational status is a master operational status, as indicated by decision block 184, may include comparing the operational status to a value representative of a master operational status. That is, the control board 48 may compare the value representative of the operational status of the control board 48 to the value representative of the master operational status. For example, the microcontroller 104 may read a value representative of the master operational status from a specified location on the control board 48 and compare the value representative of the master operational status to the value representative of the control board's 48 operational status to determine whether the two values are equivalent.

When the operational status of the control board 48 is the master operational status, that is, the value representative of the master operational status is equivalent to the value representative of the control board's 48 operational status, the control board 48 may determine that the target communication protocol to be implemented on a switchable communication bus 110C is a first communication protocol, as indicated by process block 186. Determining that the target communication protocol is the first communication protocol may include determining a mapping from the master operational status to a suitable communication protocol. That is, the master operational status may be associated with or mapped to a suitable communication protocol on the control board 48 via configuration data, registers, a table, and/or a suitable data structure. As such, in some embodiments, the microcontroller 104 may determine the target communication protocol is the first communication protocol by accessing a data field representative of the target communication protocol that is mapped to the master operational status.

On the other hand, when the operational status of the control board 48 is not the master operational status, or the value representative of the master operational status is not equivalent to the value representative of the control board's 48 operational status, the control board 48 may determine that the target communication protocol to be implemented on a switchable communication bus 110C is a second or different communication protocol, as indicated by process block 188. Determining that the target communication protocol is the second communication protocol may involve determining a mapping from the subordinate operational status to a suitable communication protocol. Similar to the mapping between the master operational status and a suitable communication protocol on the control board 48, as discussed above, the mapping between the subordinate operational status and the suitable communication protocol may be captured in configuration data, registers, a table, and/or a suitable data structure. As such, in some embodiments, the microcontroller 104 may determine the target communication protocol is the second communication protocol by accessing a data field representative of the target communication protocol that is mapped to the subordinate operational status. In any case, according to the process 180, the control board 48 may determine the target communication protocol based at least in part on the operational status of the control board 48.

Figure 10:
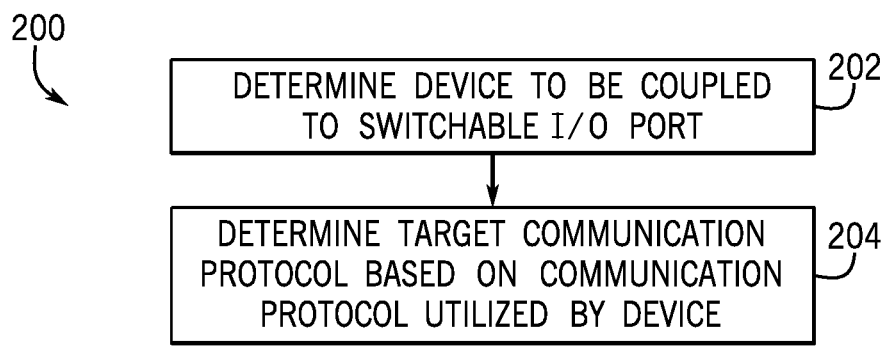
FIG. 10 is a flow diagram of another process for determining target communication protocol to be implemented on a switchable communication bus on the control board of FIG. 6, in accordance with an embodiment of the present disclosure.

As described above, the control board 48 may additionally or alternatively determine target communication protocol based on a device expected to be connected to switchable I/O port 106C. To help illustrate, another example of a process 200 for determining target communication protocol to be implemented on a switchable communication bus 110C is described in FIG. 10. Although the following description of the process 200 is described in a particular order, which represents a particular embodiment, it should be noted that the process 200 may be performed in any suitable order. Moreover, embodiments of the process 200 may omit process blocks and/or include suitable additional process blocks.

The process 200 generally includes determining a device to be coupled to the switchable I/O port 106C, as indicated by process block 202, and determining the target communication protocol based on a communication protocol used by the device, as indicated by process block 204. In some embodiments, the process 200 may be implemented at least in part by executing instructions stored in a tangible, non-transitory, computer-readable medium, such as memory 107, using processing circuitry, such as processor 105.

Determining a device to be coupled to the switchable I/O port 106C, as indicated by process block 202, may involve accessing data within the control board 48 and/or on the device. In some embodiments, the control board 48 may receive an input indicating the device expected to be coupled to the switchable I/O port 106C. In such embodiments, for example, the control board 48 may receive an input via an interface device 114 coupled to the control board 48 and/or via an interface, such as interface board 90, included in the control board 48, which provides an indication of the device that is expected to be coupled to the switchable I/O port 106C. That is, prior to coupling the device to the switchable I/O port 106C, the control board 48 may determine the device to be coupled to the switchable I/O port 106C via a received input.

Further, in some embodiments, if no input regarding a device to be coupled to the switchable I/O port 106C is received, the control board 48 may determine that the device to be coupled to the switchable I/O port 106C matches a device that was last coupled to the switchable I/O port 106C. That is, the control board 48 may store information related to the last device coupled to the switchable I/O port 106C and may default to using the information related to the last device for a device to be coupled to the switchable I/O port 106C when no additional input is received. As such, in cases where a device is coupled to the switchable I/O port 106C becomes decoupled from the switchable I/O port 106C and is recoupled to the switchable I/O port 106C before any other device is coupled to the switchable I/O port 106C, the control board 48 may automatically use the information stored for the device, for example, without an additional input regarding the device to be recoupled to the switchable I/O port 106C.

Determining the target communication protocol based on a communication protocol utilized by the device, as indicated by process block 204, may include accessing information related to the device. In some embodiments, the accessed information related to the device may be included in the received input regarding the device. As such, the received input may include information identifying the device to be coupled to the switchable I/O port 106C, as well as the communication protocol supported by the device. In such embodiments, the control board 48 may access the information regarding the communication protocol to determine the target communication protocol. In other embodiments, the control board 48 may include a mapping or table of devices and their respectively supported communication protocols. The mapping may periodically be updated, for example, via an interface device 114 and/or the interface board 90. As such, with the device to be coupled to the switchable I/O port 106C identified, the control board 48 may determine the communication protocol supported by the device based on the mapping of the device to its supported communication protocol and determine the target communication protocol as a result. In this manner, the control board 48 may determine target communication protocol based at least in part on the communication protocol utilized by a device to be coupled to the switchable I/O port 106C. Further, in cases where the device to be coupled to the switchable I/O port 106C is determined to be the last device coupled to the switchable I/O port 106C, as described above, the control board 48 may determine the target communication protocol based at least in part on the most recently implemented communication protocol, which may have been utilized for the last device coupled to the switchable I/O port 106C.

In some embodiments, the process 200 for determining target communication protocol to be implemented on a switchable communication bus 110C may additionally or alternatively involve testing communication with the device. For example, the microcontroller 104 may send a test input to the device using the first communication protocol. Based on a response to the input, the microcontroller 104 may determine the device to be coupled to the switchable I/O port 106C and/or that the first communication protocol is utilized by the device, which may be used to determine the target communication protocol, as indicated by process block 204. If a response to the input is not received, the microcontroller 104 may transmit a second input using the second communication protocol to the device. Thus, based on a response to the second input, the microcontroller 104 may determine the device to be coupled to the switchable I/O port 106C and/or that the second communication protocol is utilized by the device and is the target communication protocol.

Figure 8:
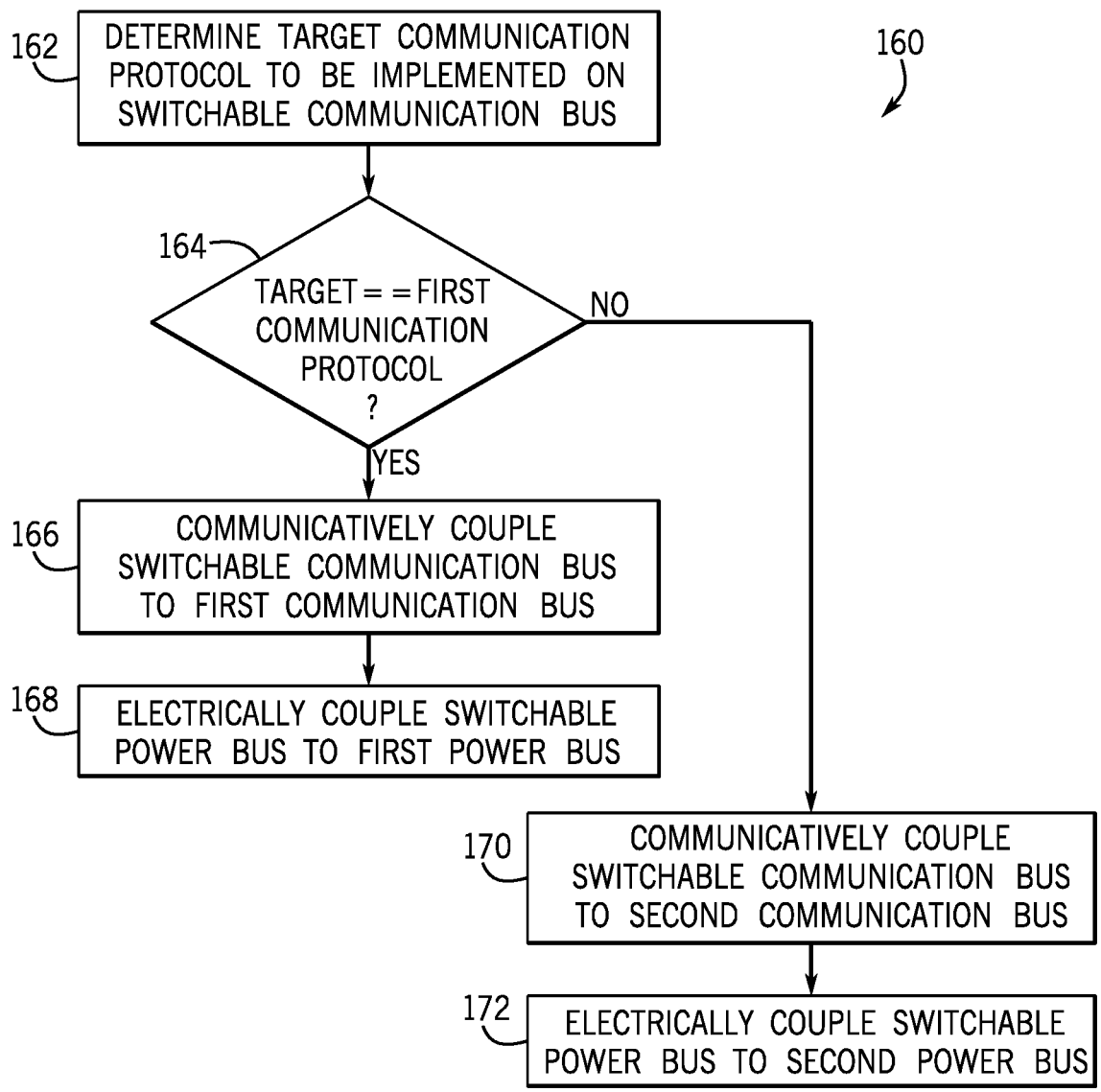
FIG. 8 is a flow diagram of a process for operating the control board of FIG. 6, in accordance with an embodiment of the present disclosure.

In any case, returning to the process 160 of FIG. 8, after the target communication protocol to be implemented on the switchable communication bus is determined, determining whether the target communication protocol is the first communication protocol, as indicated by decision block 164, may involve comparing data related to the target communication protocol to data related to the first communication protocol and determining whether the data are equivalent. In some embodiments, data related to a communication protocol may include an identifier, data rate, checksum implementation, and/or the like associated with the communication protocol. The data may be contained in a data structure stored in the control board 48. As such, comparing the data related to the target communication and the first communication protocol may involve comparing some or all of the data attributes, such as identifiers, data rates, checksum implementations, and/or the like, to determine whether the two communication protocols are equivalent.

When the target communication protocol is equivalent to the first communication protocol, communicatively coupling the switchable communication bus 110C to the first communication bus 110A, as indicated by process block 166, may involve the microcontroller 104. As discussed above, the microcontroller 104 may maintain a map of addresses in software of each of the communication connections included in the I/O ports 106 to a suitable communication protocol. The mapping of communication protocols to each of the communication connections may enable each I/O port 106 to implement a suitable communication protocol on a respective communication bus 110. In some embodiments, for example, each communication protocol may include a separate mapping of addresses in software for their respective connections. As such, coupling the switchable communication bus 110C to the first communication bus 110A may involve updating a mapping of addresses of the first communication protocol connections to include the connections of the switchable I/O port 106C. To that end, by associating the communication connections of the switchable I/O port 106C with the first communication protocol, the switchable I/O port 106C may communicatively couple to a device supporting the first communication bus 110A.

Further, as the first communication protocol may govern parameters such as a data transmission rate and/or checksum data, communicatively coupling the switchable communication bus 110C to the first communication bus 110A may include utilizing the microcontroller 104 to perform error detection, according to the parameters of the first communication protocol, on data transmitted via the first communication bus 110A and/or on data transmitted via the switchable communication bus 110C. In some embodiments, for example, the microcontroller may perform a first error detection on data (e.g., test data) received from the first communication bus 110A based on the checksum data and/or the data transmission rate of the first communication protocol. That is, the microcontroller 104 may verify that the data was transmitted according to the first communication protocol by comparing the checksum data and/or data transmission rate of the data to the checksum data and/or the transmission rate of the first communication protocol, respectively. If the data was transmitted according to the first communication protocol, the data may pass the first error detection, and the microcontroller 104 may then output this data to the switchable communication bus 110C. In response to receiving the data and/or in a separate event, second data (e.g., test data) may be transmitted from the switchable communication bus 110C to the microcontroller 104. The microcontroller may then perform a second error detection on the second data based on the checksum data and/or data transmission rate of the first communication protocol to verify that the second data was transmitted according to the first communication protocol. If the second data was transmitted according to the first communication protocol, the microcontroller 104 may output the second data to the first communication bus 110A. Accordingly, a device coupled to the first I/O port 106A may receive confirmation (e.g., notification) that a device coupled to the switchable I/O port 106C is communicatively coupled to the first communication bus 110A and is capable of communicating according to the first communication protocol, and by receiving the data, the device coupled to the switchable I/O port 106C may receive confirmation that the device coupled to the first I/O port 106A is also communicatively coupled to the first communication bus 110A and is capable of communicating according to the first communication protocol.

Electrically coupling the switchable power bus 112C to the first power bus 112A, as indicated by process block 168, may involve the switching device 108. As discussed, the switching device may receive the first electrical power supply from the first power bus 112A and may receive the second electrical power supply from the second power bus 112B. As such, to electrically couple the switchable power bus 112C to the first power bus 112A, the switching device may receive an input from the control board 48 or the microcontroller 104 and connect the third power wire 122C of the switchable power bus 112C to the first power wire 122A of the first power bus 112A based on the input. As such, the switching device 108 may, via a switch, route the first electrical power from the power source input 130 to the switchable power bus 112C so that the switchable I/O port 106C may conduct the first electrical power supply from and electrically couple to a device.

When the target communication protocol is not the first communication protocol, communicatively coupling the switchable communication bus 110C to the second communication bus 110B, as indicated by process block 170, may also involve the microcontroller 104. For example, the microcontroller 104 may update a mapping of addresses of the second communication protocol connections to include the connections of the switchable I/O port 106C to couple the switchable communication bus 110C to the second communication bus 110B. To that end, by associating the communication connections of the switchable I/O port 106C with the second communication protocol, the switchable I/O port 106C may communicatively couple to a device supporting the second communication bus 110B. Further, as described above, the microcontroller 104 may perform error detection on data received from the second communication bus 110B and/or the switchable communication bus 110C based on the parameters (e.g., checksum data and/or data transmission rate) governed by the second communication protocol to verify that the second communication bus 110B and/or the switchable communication bus 110C are suitably transmitting data according to the second communication protocol so that the switchable communication bus 110C and the second communication bus 110B may be communicatively coupled.

Electrically coupling the switchable power bus 112C to the second power bus 112B, as indicated by process block 172, may also involve the switching device 108. To electrically couple the switchable power bus 112C to the second power bus 112B, the switching device 108 may receive an input from the control board 48 or the microcontroller 104 and connect the third power wire 122C of the switchable power bus 112C to the second power wire 122B of the second power bus 112B based on the input. As such, the switching device 108 may route the second electrical power from the second power bus 112B to the switchable power bus 112C so that the switchable I/O port 106C may electrically couple to a device.

The specific embodiments described above have been shown by way of example, and it should be understood that these embodiments may be susceptible to various modifications and alternative forms. It should be further understood that the claims are not intended to be limited to the particular forms disclosed, but rather to cover all modifications, equivalents, and alternatives falling within the spirit and scope of this disclosure.

What is claimed is:

1. A heating, ventilation, and air conditioning (HVAC) system comprising a control board, wherein the control board comprises:
   a microcontroller programmed to control operation of equipment in the HVAC system;
   a first input/output (I/O) port communicatively coupled to the microcontroller via a first communication bus, wherein the microcontroller is programmed to communicate on the first communication bus using a first communication protocol;
   a second I/O port communicatively coupled to the microcontroller via a second communication bus, wherein the microcontroller is programmed to communicate on the second communication bus using a second communication protocol different from the first communication protocol;
   a switching device electrically coupled to the first I/O port via a first power bus and electrically coupled to the second I/O port via a second power bus; and
   a switchable I/O port communicatively coupled to the microcontroller via a switchable communication bus and electrically coupled to the switching device via a switchable power bus, wherein, when the equipment is coupled to the switchable I/O port, the microcontroller is programmed to:
      determine a target communication protocol used by the equipment; and
      when the target communication protocol is the first communication protocol:
         communicatively couple the switchable communication bus and the first communication bus; and
         instruct the switching device to electrically couple the switchable power bus and the first power bus.

2. The HVAC system of claim 1, wherein, when the equipment is coupled to the switchable I/O port and the target communication protocol used by the equipment is not the first communication protocol, the microcontroller is programmed to:
   communicatively couple the switchable communication bus to the second communication bus; and
   instruct the switching device to electrically couple the switchable power bus to the second power bus.

3. The HVAC system of claim 1, comprising:
   a first power source electrically coupled to the control board, wherein the first power source is configured to output electrical power with first power parameters; and
   a second power source electrically coupled to the control board, wherein the second power source is different from the first power source and is configured to output electrical power with second power parameters.

4. The HVAC system of claim 3, wherein the first power source comprises an indoor transformer, an outdoor transformer, or an additional control board.

5. The HVAC system of claim 1, comprising:
   a first power source electrically coupled to a first power source input on the control board, wherein:
      the first power source is configured to output electrical power with first parameters; and the first power source input is electrically coupled to the first I/O port and to the switching device via the first power bus;
an additional control board comprising a second power source input and a third I/O port; and
a second power source electrically coupled to the second power source input on the additional control board, wherein:
the second power source is different from the first power source and is configured to output electrical power with second parameters; and
to determine the target communication protocol when the equipment is coupled to the switchable I/O port, the microcontroller is programmed to determine that the target communication protocol is the second communication protocol when the second I/O port on the first control board is coupled to the third I/O port on the other control board via an external bus.

6. The HVAC system of claim 1, wherein, to communicatively couple the switchable communication bus and the first communication bus, the microcontroller is programmed to:
when first data is received from the first communication bus:
perform a first error detection on the first data based at least in part on a first checksum in the first data; and
output the first data to the switchable communication bus when the first data passes the first error detection; and
when second data is received from the switchable communication bus:
perform a second error detection on the second data based at least in part on a second checksum in the second data; and
output the second data to the switchable communication bus when the second data passes the second error detection.

7. The HVAC system of claim 1, wherein the microcontroller is programmed to:
communicate data on the switchable communication bus using the first communication protocol when a thermostat is coupled to the switchable I/O port; and
communicate data on the switchable communication bus using the second communication protocol when a motor drive is coupled to the switchable I/O port.

8. The HVAC system of claim 7, wherein the microcontroller is programmed to:
instruct the switching device to electrically couple the first power bus to the switchable power bus when the thermostat is coupled to the switchable I/O port; and
instruct the switching device to electrically couple the second power bus to the switchable power bus when the motor drive is coupled to the switchable I/O port.

9. The HVAC system of claim 1, wherein the microcontroller is programmed to:
communicate data on the switchable communication bus using the first communication protocol when a thermostat is coupled to the switchable I/O port; and
communicate data on the switchable communication bus using the second communication protocol when another control board is coupled to the switchable I/O port.

10. The HVAC system of claim 1, wherein the microcontroller is programmed to:
determine an operational status of the control board;
communicate data on the switchable communication bus using the first communication protocol when the operational status indicates that the control board is a master control board; and
communicate data on the switchable communication bus using the second communication protocol when the operational status indicates that the control board is a subordinate control board.

11. A method for controlling operation of equipment coupled to a switchable input/output (I/O) port of a control board in a heating, ventilation, and air conditioning (HVAC) system, comprising:
determining, using at least one processor in the HVAC system, a target communication protocol used by the equipment;
communicatively coupling a switchable communication bus on the control board and a first communication bus on the control board when the target communication protocol is a first communication protocol, wherein the switchable communication bus is communicatively coupled to the switchable I/O port and the first communication protocol governs communication on the first communication bus;
instructing, using the at least one processor, a switching device to electrically couple a switchable power bus and a first power bus when the target communication protocol is the first communication protocol, wherein the switchable power bus is electrically coupled to the switchable I/O port;
communicatively coupling the switchable communication bus and a second communication bus on the control board when the target communication protocol is not the first communication protocol, wherein a second communication protocol different from the first communication protocol and governs communication on the second communication bus; and
instructing, using the at least one processor, the switching device to electrically couple the switchable power bus and a second power bus when the target communication protocol is not the first communication protocol.

12. The method of claim 11, comprising receiving, via an interface device in the HVAC system, an input related to the equipment, wherein the target communication protocol is determined based at least in part on the input.

13. The method of claim 12, wherein the input comprises an identity of the equipment, a type of the equipment, a manufacturer of the equipment, the target communication protocol used by the equipment, or any combination thereof.

14. The method of claim 11, comprising:
retrieving information related to a most recently implemented communication protocol, wherein the information is stored in memory on the control board; and
determining the target communication protocol based at least in part on the information related to the most recently implemented communication protocol.

15. The method of claim 11, wherein:
electrically coupling the switchable power bus and the first power bus comprises electrically isolating the switchable power bus from the second power bus; and
electrically coupling the switchable power bus and the second power bus comprises electrically isolating the switchable power bus from the first power bus.

16. The method of claim 11, comprising:
electrically coupling a first power source to the first power bus via a first power source input on the control board; and electrically coupling a second power source to the second power bus via a second power source input on the control board, wherein the second power source is different from the first power source.

17. A tangible, non-transitory, computer-readable medium, comprising instructions executable by at least one processor of a control system in a heating, ventilation, and air conditioning (HVAC) system that, when executed by the at least one processor, cause the at least one processor to:
determine a target communication protocol used by equipment in the HVAC system coupled to a switchable input/output (I/O) port on a control board in the control system;
instruct a switching device to electrically couple a switchable power bus on the control board and a first power bus on the control board when the target communication protocol is a first communication protocol; and
instruct the switching device to electrically couple the switchable power bus and a second power bus on the control board when the target communication protocol is a second communication protocol different from the first communication protocol.

18. The computer-readable medium of claim 17, wherein the instructions, when executed by the at least one processor, cause the at least one processor to:
determine an operational status of the control board;
determine that the target communication protocol is the first communication protocol when the operational status indicates that the control board is a master control board; and
determine that the target communication protocol is the second communication protocol when the operational status indicates that the control board is a subordinate control board.

19. The computer-readable medium of claim 18, wherein the operational status of the control board is determined based at least in part on the equipment in the HVAC system coupled to the switchable I/O port.

20. The computer-readable medium of claim 17, wherein the instructions, when executed by the at least one processor, cause the at least one processor to:
instruct the switching device to electrically couple the first power bus to the switchable power bus when a thermostat is coupled to the switchable I/O port; and
instruct the switching device to electrically couple the second power bus to the switchable power bus when a motor drive is coupled to the switchable I/O port.

* * * * *